United States Patent Office 3,714,250
Patented Jan. 30, 1973

3,714,250
N,N-DIETHYL (2-ALLYL-TERT-BUTYL SUBSTITUTED-PHENOXY) ACETAMIDES
Richard Rips, Paris, France, assignor to Institut National de la Sante et de la Recherche Medicale and Les Laboratoires Millot, both of Paris, France
No Drawing. Filed Dec. 29, 1969, Ser. No. 888,857
Claims priority, application France, Dec. 31, 1968, 182,835
Int. Cl. C07d 103/22
U.S. Cl. 260—559 B                        2 Claims

ABSTRACT OF THE DISCLOSURE

Derivatives of mono- or ditertiary butyl phenols and of mono- and di-tertiary butyl o-alkyl phenols in which the phenolic hydrogen atom is substituted by an $$NH_2\text{—}CO\text{—}O\text{—}$$

or $NH_2$—CO—$CH_2$—O group or corresponding group wherein the amino hydrogen atoms are replaced by ethyl groups are described, together with processes for their manufacture. The compounds are chemotherapeutically valuable for their tranquillizing, hypnogenic, analgesic, psychotonic, antidepressant and anticonvulsant activity.

This invention relates to new chemical compounds which are derivatives of tertiary-butyl phenol and which have chemotherapeutic value, to the production of the said compounds and to pharmaceutical compositions containing the same.

According to the present invention there are provided tertiary-butyl phenol derivatives of the general Formula I

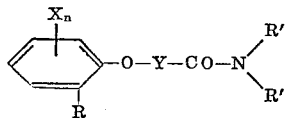

I wherein X is a tertiary butyl group—$C(CH_3)_3$, $n$ represents 1 or 2, R is a hydrogen atom or an allyl group, Y represents a direct linkage between the indicated —O— and —CO— groups or is a —$CH_2$— group and R' represents hydrogen or ethyl, the group X, when $n$ is one, being in position ortho or meta to the phenolic oxygen atom when Y is a direct linkage, or being in position ortho, meta or para to the phenolic oxygen atom when Y is a —$CH_2$— group, and the groups X, when $n$ is two, being in 2:4 or 3:5 relationship, or a salt of a said derivative.

Compounds of general Formula I may be prepared from 2,3- or 4-tert-butyl phenols, and from 2,4- and 3,5-di-tert-butyl phenols, by preparing first the allyl tert-butyl phenols, for example as described in application Ser. No. 780,564 filed Dec. 2, 1968, and now abandoned, by condensing an allyl halide with the phenol in the presence of sodium or potassium carbonate in an organic diluent, preferably dimethyl formamide or dimethyl sulphoxide, then transforming the allyl ether by the Claisen method in the presence of a diluent selected from ortho dichlorobenzene, dimethyl formamide or diethylene glycol (the last of these being preferred) and then converting the phenolic products obtained (a) Into carbamates by the application of known methods particularly that described by B. Loer and M. F. Kormendy, Journal of Organic Chemistry, 1963, 28, 3421 for the primary carbamates, by known methods, especially the production of a phenyl chloroformate and the condensation of this with a secondary amine (H. Normant, Chimie Organique, p. 398, edited by Masson) for the carbamates containing two substituents on the nitrogen atom (b) Into primary or tertiary oxyacetamides by known methods, in particular by a reaction analogous to that of Williamson, Chemical Reviews, 1934, 14, 409, and especially by the condensation of a chloroacetamide, with or without substituents linked to the nitrogen atom, with a sodium salt of the selected phenol.

In particular, according to the present invention there are provided processes for the production of compounds of the aforesaid general Formula I which comprises, in the case where R' is hydrogen and Y is a direct linkage condensing a tertiary-butyl phenol of the Formula II

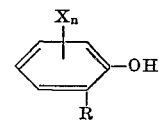

II where R, X and $n$ have the meanings assigned to them above, with an alkali metal cyanate in the presence of trifluoroacetic acid; in the case where R' is ethyl and Y is a direct linkage condensing a phenol chloroformate of the Formula III:

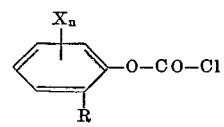

III where X, $n$ and R have the meanings assigned to them above, with diethylamine: and in the case where Y is —$CH_2$— condensing a compound of the Formula II in the form of its alkali metal salt with a haloacetamide of the Formula IV:

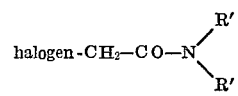

The following examples will serve to illustrate the production of compounds according to the invention:

EXAMPLE 1

(a) 2-allyl-6-tert-butyl phenol

A mixture of the allyl ether of 2-tert-butyl phenol (1 mol) and rectified ethylene glycol (same volume) was refluxed for 3 hours, cooled, poured into water, and extracted with petroleum ether. The organic phase is taken up in Claisen liquor (70 g. of potassium dissolved in 50 ml. water and diluted with 200 ml. methanol), acidified, re-extracted with petroleum ether, the solvent evaporated off and the product distilled under high vacuum.

The product has B.P. $_{0.4\ mm}$. 60° C. and index of refraction $n_{25}^D = 1.5197$. It analyses as follows:

Calculated (percent): C, 82.06; H, 9.5; O, 8.41. Found (percent): C, 82.01; H, 9.48; O, 8.28.

(b) 2-allyl-6-tert-butyl phenyl carbamate (coded for reference as R.782

There is introduced with an Erlenmeyer flask (250 ml.) provided with a magnetic stirrer, a solution of 19 g. of 2-allyl-6-tert-butyl phenol (0.1 mol) in 100 ml. of dry methylene chloride. There is then added 13 g. of sodium cyanate (0.2 mol) and then 22.8 g. of trifluoroacetic acid (0.2 mol). Slight warming and some effervescence occurs.

The reaction mixture is allowed to stand for 15 hours at ambient temperature and then poured into 150 ml. of water and extracted three times with 50 ml. of methylene chloride. The organic solution thus obtained is then dried over sodium sulphate, the solvent is evaporated and the residue (24 g.) rectified under high vacuum. The heads of the distillation (10 g.) are principally unchanged phenol. The solid, undistilled, fraction is recrystallised from hexane. There is thus obtained 11.4 g. (a yield of 49%) of colourless microcrystals M.P. 88–89° C.

EXAMPLES 2 TO 9

By proceeding as in Example 1, using various tertiary-butyl phenols (themselves prepared according to part (a) of Example 1) there are obtained the products identified in the following table.

TABLE I

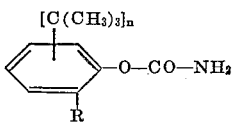

| Ex. No. | Code No. | Position of tertiary butyl group(s) | R | Yield, percent | M.P. (° C.) | Solvent |
|---|---|---|---|---|---|---|
| 2 | R.784 | 2 | H | 89 | 88–89 | Hexane. |
| 3 | R.781 | 3 | H | 92 | 170 | Ethanol. |
| 4 | R.748 | 5 | Allyl | 47 | 98.5 | Hexane. |
| 5 | R.702 | 4 | do | 55 | 87.5 | Heptane. |
| 6 | R.774 | 2,4 | H | 96 | 152 | Cyclohexane. |
| 7 | R.786 | 4,6 | Allyl | 94 | 119 | Hexane. |
| 8 | R.772 | 3,5 | H | 93 | 100 | Do. |
| 9 | R.763 | 3,5 | Allyl | 41 | 103 | Do. |

EXAMPLE 10

3-tert-butyl-phenyl-N,N-diethyl carbamate (R 964)

A reaction vessel provided with an efficient agitator, means for introduction of reactants (dropping funnel) and a reaction-slowing device (refrigerant) is charged with 15 g. (1 mol) of meta tert-butyl phenol and then, in a single quantity 49.5 g. of a 20% solution of phosgene in toluene (0.1 mol; 52 ml.). The mixture is cooled in a mixture of ice and salt. The internal temperature thus being maintained at 5 to 10° C. the agitator is set in action and there is added, drop by drop, 12.1 g. (0.1 mol, 12.8 ml.) of N,N-dimethyl aniline. The temperature should not exceed 10° C. during the whole of the addition. The mixture is then allowed to regain ambient temperature and is allowed to stand until the whole of the dimethylaniline hydrochloride has precipitated, which takes about 2 hours. It is not necessary to isolate the chloroformate thus formed if an efficient agitator is used: if not, the hydrochloride is separated, washed with isopropyl ether, the solvent evaporated and the residue used for the further processing.

There is added to the chloroformate, in small portions, 14.6 g. (0.2 mol) of diethylamine. Continuously with this addition 0.1 mol of the diethylamine fixes the freed hydrogen chloride and is precipitated. When the addition is completed 100 ml. of isopropyl ether, in which the diethylamine hydrochloride is insoluble, is added. The product is filtered, the filtrate washed twice with 100 ml. of normal caustic soda and then with water, the solvent evaporated and the product distilled and rectified at 110° C. and 0.25 mm. pressure. There is thus obtained, in a yield of about 75%, a colourless liquid $n^{25°}=1.4989$.

Using the same procedure as in Example 10 and using various tertiary-butyl phenols and various secondary amines there are obtained the compounds identified in the following Table III.

TABLE III

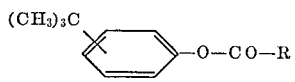

| Example No. | Code No. | Position of the tertiary butyl group | R | Yield, percent | B.P. (° C./mm. Hg) | M.P. (° C.) (solvent) or n 25° |
|---|---|---|---|---|---|---|
| 11 | R.995 | 2 | N(C₂H₅)₂ | 74 | 101/0.15 | 1.5023. |
| 12 | R.994 | 4 | N(C₂H₅)₂ | 76.5 | 120/0.2 | 86 (pentane). |
| 13 | R.982 | 3 | N(iso-propyl)₂ | 75 | 122/0.25 | 1.493. |
| 14 | R.983 | 3 | N(butyl)₂ | 70 | 158/0.6 | 1.4915. |
| 15 | R.947 | 3 | N(iso-butyl)₂ | 65 | 118/0.12 | 1.4883. |
| 16 | R.996 | 3 | N(amyl)₂ | 74 | 169/0.45 | 1.4883. |
| 17 | R.948 | 3 | N(hexyl)₂ | 65 | 160/0.07 | 1.4855. |
| 18 | R.997 | 3 | (piperidinyl) | 73 | 138/0.25 | 1,5238. |
| 19 | R.998 | 3 | (piperazinyl)–N–C₂H₅ | 68 | 165/0.35 | 58 (pentane). |
| 20 | R.954 | 3 | (piperazinyl)–N–(cyclohexyl) | 88 | 182/0.2 | 76 (pentane). |
| 21 | R.957 | 3 | (pyrrolidinyl) | 76 | 147/0.35 | 67 (pentane). |
| 22 | R.965 | 3 | (morpholinyl) | 80 | — | 86 (hexane). |
| 23 | R.984 | 3 | (N-methylpiperazinyl)–CH₃ | 65 | 148/0.25 | 74.5 (hexane). |

The results of the analyses is set forth in Table IV:

TABLE IV

| Example No. | Calculated, percent | | | | Found, percent | | | |
|---|---|---|---|---|---|---|---|---|
| | C | H | N | O | C | H | N | O |
| 11 | 72.25 | 9.30 | 5.62 | 12.83 | 72.47 | 9.47 | 5.69 | 12.74 |
| 12 | 72.25 | 9.30 | 5.62 | 12.83 | 72.32 | 9.28 | 5.63 | 12.87 |
| 13 | 73.61 | 9.81 | 5.05 | 11.53 | 73.61 | 9.68 | 5.28 | 11.40 |
| 14 | 74.71 | 10.23 | 4.59 | 10.48 | 74.53 | 10.25 | 4.96 | 10.75 |
| 15 | 74.71 | 10.23 | 4.59 | 10.48 | 74.70 | 10.27 | 4.61 | 10.45 |
| 16 | 75.64 | 10.57 | 4.20 | 9.59 | 75.61 | 10.75 | 4.13 | 9.75 |
| 17 | 76.40 | 10.87 | 3.87 | 8.85 | 76.72 | 10.87 | 3.91 | 8.83 |
| 18 | 72.85 | 8.55 | 5.66 | 12.94 | 72.92 | 8.58 | 5.77 | 12.87 |
| 19 | 75.46 | 9.33 | 4.63 | 10.58 | 75.42 | 9.35 | 4.58 | 10.57 |
| 20 | 77.26 | 9.87 | 3.92 | 8.95 | 77.12 | 9.76 | 3.96 | 9.02 |
| 21 | 73.53 | 8.87 | 5.36 | 12.24 | 73.50 | 9.10 | 5.46 | 12.13 |
| 22 | 68.42 | 8.04 | 5.32 | 18.23 | 68.59 | 7.99 | 5.40 | 18.15 |
| 23 | 69.53 | 8.75 | 10.14 | 11.58 | 69.60 | 8.82 | 9.99 | 11.71 |

EXAMPLE 24

2-allyl-6-tert-butyl acetamidoxy-benzene (R 744)

There is added successively to a 500 ml. vessel: 0.1 mol of 2-allyl-6-tert-butyl phenol (19 g.), 100 ml. of absolute ethyl alcohol, and 100 ml. of an ethyl alcoholic solution of sodium prepared from 2.3 g. of sodium. The solution should be yellow, then deep green, It is boiled for 10 minutes. After cooling this solution is poured into a 500 ml. flask and evaporated under medium vacuum (20 mm. Hg) on a steam bath.

The residue, free from alcohol, is taken up in 200 ml. of dimethyl formamide (DMF) and poured into 1000 ml. Erlenmeyer flask; there is then added a solution of 0.1 mol of chloroacetamide (9.3 g.) in 100 ml. of DMF. A condenser is fitted and the mixture maintained at boiling point for 3 hours.

After cooling the mixture is filtered to separate the sodium chloride formed and the filtrate is collected in a 500 ml. flask. The DMF is evaporated at medium vacuum and the solid residue is recrystallised from cyclohexane with addition of animal charcoal. The yield is about 30%; M.P. 107° C.

EXAMPLE 25

N,N-diethyl (2-allyl-5-tert-butyl-phenoxy) acetamide (R.732)

The sodium salt of 2-allyl-5-tert-butyl phenol is prepared as in Example 24 and there is then added 4 g. of sodium hydroxide in 5 ml. water and 19 g. of phenol in 50 ml. of absolute ethyl alcohol and the mixture evaporated to dryness under medium vacuum.

The sodium phenolate, free from alcohol, is then taken up in DMF and treated as above with the sole difference that there is added 0.1 mol of N,N-diethyl chloroacetamide instead of 0.1 mol of chloroacetamide. The product is distilled and rectified at 160° C. at 0.3 mm. Hg. The average yield is of the order of 60%.

EXAMPLES 26 TO 43

The compounds identified in Table V are prepared analogously from various tert-butyl phenols.

The analyses of these products is tabulated in Table VI:

TABLE VI

| Example No. | Calculated, percent | | | | Found, percent | | | |
| --- | --- | --- | --- | --- | --- | --- | --- | --- |
| | C | H | N | O | C | H | N | O |
| 26 | 69.54 | 8.26 | 6.76 | 15.44 | 69.81 | 8.18 | 6.80 | 15.45 |
| 27 | 72.96 | 9.57 | 5.32 | 12.15 | 72.54 | 9.71 | 5.44 | 12.43 |
| 28 | 75.21 | 9.63 | 4.62 | 10.54 | 74.96 | 9.68 | 5.00 | 10.84 |
| 29 | 69.54 | 8.26 | 6.76 | 15.44 | 69.59 | 8.32 | 6.84 | 15.29 |
| 30 | 72.96 | 9.57 | 5.32 | 12.15 | 72.78 | 9.67 | 5.21 | 12.25 |
| 31 | 72.84 | 8.56 | 5.66 | 12.94 | 72.88 | 8.48 | 5.84 | 13.05 |
| 32 | 69.54 | 8.26 | 6.76 | 15.44 | 69.52 | 8.29 | 7.29 | 15.67 |
| 33 | 72.96 | 9.57 | 5.32 | 12.15 | 72.84 | 9.84 | 5.52 | 12.17 |
| 34 | 72.84 | 8.56 | 5.66 | 12.94 | 72.83 | 8.57 | 5.84 | 13.10 |
| 35 | 75.21 | 9.63 | 4.62 | 10.54 | 75.34 | 9.78 | 4.88 | 10.85 |
| 36 | 72.97 | 6.56 | 5.32 | 12.15 | 72.98 | 9.49 | 5.60 | 12.49 |
| 37 | 75.19 | 10.41 | 4.38 | 10.02 | 75.15 | 10.51 | 4.44 | 10.12 |
| 38 | 75.21 | 9.62 | 4.62 | 10.55 | 75.21 | 9.47 | 4.71 | 10.79 |
| 39 | 76.83 | 10.37 | 3.90 | 8.90 | 76.60 | 10.31 | 3.76 | 9.02 |
| 40 | 72.97 | 9.56 | 5.32 | 12.15 | 72.95 | 9.45 | 5.33 | 12.00 |
| 41 | 75.19 | 10.41 | 4.38 | 10.02 | 75.36 | 10.44 | 4.35 | 10.22 |
| 42 | 75.21 | 9.62 | 4.62 | 10.55 | 75.09 | 9.64 | 4.63 | 10.61 |
| 43 | 76.83 | 10.37 | 3.90 | 8.90 | 76.82 | 10.46 | 4.00 | 8.76 |

The compounds of the present invention have been found to be of important chemotherapeutic value and have accordingly been subjected to pharmacological tests, for which purpose they have been placed in solution in aqueous or oily media or tested in the form of suspensions.

The compounds of the foregoing examples have a low toxicity, their $DL_{50}$ values (intraperitoneal, in the mouse) being generally between 300 and 600 mg./kg.; the values are invariably above 1 g./kg. if administered by the buccal route.

The compounds have been tested in particular for the study of behaviour by the turning rod, apertured plate, chimney and actograph methods, for the study of analgesic action by the Lespagnol-Mercier and Siegmund methods, for the study of antidepressive action by the reserpinic ptosis method and the method of antagonism to the action of tetrabenazine, and for the study of anticonvulsive activity by the methods of antagonism to the actions of cardiazol, tremorine and strychnine.

All the compounds of the foregoing examples have been subjected to these tests and some have been subjected to a complementary pharmacological testing.

In these conditions, it is observed that compounds R. 770, 784 and 781 are central stimulants, compounds R. 729, 742 and 749 have tranquilising and analgesic activ-

TABLE V

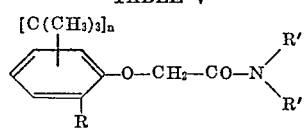

| Example No. | Code No. | R | R′ | Yield, percent | B.P. (° C./ mm. Hg) | M.P. (° C.) or $n_{25}{}^D$ | Solvent |
| --- | --- | --- | --- | --- | --- | --- | --- |
| 26 | R.780 | 2 H | H | 42 | | 120 | Cyclohexane. |
| 27 | R.776 | 2 H | C₂H₅ | 88 | 129/0.2 | 1.5156 | |
| 28 | R.724 | 6 Allyl | C₂H₅ | 59 | 144/0.1 | 1.5209 | |
| 29 | R.742 | 3 H | H | 45 | | 86 | Heptane. |
| 30 | R.723 | 3 H | C₂H₅ | 64 | 118/0.06 | 1.5103 | |
| 31 | R.749 | 5 Allyl | H | 36.5 | | 71 | Hexane. |
| 32 | R.779 | 4 H | H | 38.5 | | 125 | Octane. |
| 33 | R.777 | 4 H | C₂H₅ | 76 | 126/0.17 | 1.5129 | |
| 34 | R.729 | 4 Allyl | H | 25 | | 106 | Hexane. |
| 35 | R.726 | 4 do | C₂H₅ | 82 | 144/0.09 | 1.5155 | |
| 36 | R.767 | 2,4 H | H | 44.5 | | 166 | Cyclohexane. |
| 37 | R.768 | 2,4 H | C₂H₅ | 95 | | 81 | Pentane. |
| 38 | R.764 | 4,6 Allyl | H | 43.5 | | 170 | Hexane. |
| 39 | R.783 | 4,6 do | C₂H₅ | 62 | 162/0.1 | 1.5108 | Do. |
| 40 | R.765 | 3,5 H | H | 66.5 | | 120 | |
| 41 | R.770 | 3,5 H | C₂H₅ | 62 | | 93 | Pentane. |
| 42 | R.763 | 3,5 Allyl | H | 40 | | 103 | Hexane. |
| 43 | R.787 | 3,5 do | C₂H₅ | 91.5 | | 51 | Pentane. | ity, compounds R. 722, 723 and 724 are hypnogenic compounds R. 726, 732, 748 and 787 are antidepressants.

By way of example, certain tests made with the compound R. 732 are now set forth.

Study of behaviour (mouse: oral route)

During the whole of the test the animals were free to drink at will. They were fasted for 4 hours before the test and fed during the administration of the R 732.

Observed symptoms:

10 mg./kg.—The animals behaved normally: 45 minutes after ingestion there appeared a slight stimulation indicated by an increase in the number of motions (toilet) and of shifts (curiosity).

100 mg./kg.—No visible effect.

1 g./kg.—An hour after ingestion the animals were prostrated without being ataxic. They retained corneal and aural reflexes but could no longer reflect response to traction. They showed neither catatonia nor ptosis. No analgesic effect was exhibited. They returned to normal behaviour after about 12 hours.

Anti-reserpinic action

The reserpine is injected by oral route at a dose of 3 mg./kg. The R 732 was simultaneously administered by the same route. The ptosis was estimated at values from 0 (eye open) to 4 (eye completely closed).

| | Dose, mm.g./kg. | No. of animals | Degree of ptoses after (hours)— | | | | |
|---|---|---|---|---|---|---|---|
| | | | 2 | 3 | 4 | 18 | 24 |
| Reserpine | 3 | 10 | 3.5 | 4 | 4 | 2.8 | 2.1 |
| Reserpine plus R 732 | 10 | 10 | 3.1 | 3.6 | 3.3 | 1.1 | 0.5 |
| | 20 | 10 | 2.3 | 3.6 | 3.1 | 2.1 | 1 |
| | 40 | 10 | 3.6 | 3 | 3.6 | 3 | 2.3 |

Anti-tetrabenazinic action

Tetrabenazine at 10 mg./kg. (s.c.) in the rat provoked a closure of the eye lids and almost completely inhibited mobilities. The compound R732 at 20 mg./kg. (i.p.) protected 60% of the animals against these symptons.

Anti-convulsive action

At a dose of 150 mg./kg. (i.p.) in the mouse, R732 totally protected animals receiving 100 mg./kg. of cardiazol. The animals treated showed no symptoms of cardiazolic crisis.

The compounds of the present invention may be used in human medicine for their action on the central nervous system; they are useful, particularly, as tranquilisers, hypnogenics, analgesics, psychotonics, antidepressives and anticonvulsants.

They may be administered orally or by parenteral or rectal routes, the active compound being for this purpose associated with a suitable solid or liquid diluent, i.e. a vehicle or excipient is pharmaceutically acceptable. The pharmaceutical preparations may be presented in solid form, for example as dragées, tablets, suppositories, capsules and the like, or in the form of liquids, for example as solutions, suspensions or emulsions.

An example of a pharmaceutical composition is that of capsules containing 10 to 30 mg. of N,N-diethyl (2-allyl-5-tert-butyl-phenoxy)-acetamide. A suitable dose is 30 to 450 mg. per day.

I claim as my invention:

1. An N,N-diethyl (2-allyl-tert-butyl-phenoxy) acetamide having the formula

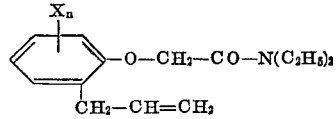

and the acid addition salts thereof, wherein X represents a tertiary-butyl group and $n$ represents 1 or 2, the group X when $n$ is two being in one of the 2:4 and 3:5 relationships.

2. N,N-diethyl (2 - allyl - 5 - tert-butyl-phenoxy) acetamide.

References Cited

UNITED STATES PATENTS 3,010,995  11/1961  Litvan et al. _____ 260—559 B
3,140,167  7/1964   Haubein _____ 260—479 C
3,215,595  11/1965  Böcker et al. _____ 260—470 C
3,557,209  1/1971   Richter et al. _____ 260—559 B

OTHER REFERENCES

C.A. 57: 16476i (1962), Ruechardt et al.
C.A. 48: 2652b (1954), Hill et al.

JOHN D. RANDOLPH, Primary Examiner

S. D. WINTERS, Assistant Examiner

U.S. Cl. X.R.

260—479 C, 621 R, 463, 326.3, 293.74, 247.2 B, 268 C; 424—324, 300